US012686633B2

(12) United States Patent
Kamitani et al.

(10) Patent No.: US 12,686,633 B2
(45) Date of Patent: *Jul. 21, 2026

(54) GLASS BODY

(71) Applicant: NIPPON SHEET GLASS COMPANY, LIMITED, Tokyo (JP)

(72) Inventors: Kazutaka Kamitani, Tokyo (JP); Yuki Shimamura, Tokyo (JP); Teruyuki Sasaki, Tokyo (JP); Mizuho Koyo, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 228 days.

This patent is subject to a terminal disclaimer.

(21) Appl. No.: 18/034,537

(22) PCT Filed: Nov. 1, 2021

(86) PCT No.: PCT/JP2021/040302
§ 371 (c)(1),
(2) Date: Apr. 28, 2023

(87) PCT Pub. No.: WO2022/092319
PCT Pub. Date: May 5, 2022

(65) Prior Publication Data
US 2024/0018035 A1      Jan. 18, 2024

(30) Foreign Application Priority Data
Oct. 30, 2020    (JP) ................................. 2020-183241

(51) Int. Cl.
C09D 5/14          (2006.01)
A01N 25/08         (2006.01)
(Continued)

(52) U.S. Cl.
CPC .............. *C03C 17/25* (2013.01); *A01N 25/08* (2013.01); *A01N 59/20* (2013.01); *C09D 1/00* (2013.01);
(Continued)

(58) Field of Classification Search
CPC ...... A01N 59/20; C09D 5/14; C03C 2204/02; C03C 2204/08; C03C 2217/17;
(Continued)

(56) References Cited

U.S. PATENT DOCUMENTS

2014/0017462 A1* 1/2014 Borrelli ................. C03C 17/007
                                                          428/210
2015/0164081 A1  6/2015 Ryan et al.
(Continued)

FOREIGN PATENT DOCUMENTS

EP      3 138 880 A1    3/2017
GB         2521405 A    6/2015
(Continued)

OTHER PUBLICATIONS

Machine translation of JP 2016/033109 A.*
(Continued)

*Primary Examiner* — Z. Jim Yang
(74) *Attorney, Agent, or Firm* — Birch, Stewart, Kolasch & Birch, LLP

(57) ABSTRACT

The glass body according to the present invention includes a plate-like glass plate having a first surface and a second surface; and an antibacterial film that is formed on the first surface and in which copper ions are dispersed.

15 Claims, 3 Drawing Sheets

(51) Int. Cl.
  *A01N 59/20* (2006.01)
  *C03C 17/25* (2006.01)
  *C09D 1/00* (2006.01)

(52) U.S. Cl.
  CPC .......... *C09D 5/14* (2013.01); *C03C 2217/213* (2013.01); *C03C 2217/253* (2013.01); *C03C 2217/283* (2013.01); *C03C 2217/29* (2013.01); *C03C 2217/76* (2013.01); *C03C 2218/11* (2013.01); *C03C 2218/32* (2013.01)

(58) Field of Classification Search
  CPC ........ C03C 2217/253; C03C 2217/254; C03C 2217/255; C03C 17/25
  See application file for complete search history.

(56) References Cited

U.S. PATENT DOCUMENTS

| | | | |
|---|---|---|---|
| 2015/0208664 A1 | 7/2015 | Borrelli et al. | |
| 2015/0230476 A1* | 8/2015 | Bookbinder | A01N 25/00 424/602 |
| 2015/0315388 A1* | 11/2015 | Park | C09D 7/60 427/404 |
| 2016/0212988 A1* | 7/2016 | Burberry | A01N 59/16 |
| 2016/0312039 A1* | 10/2016 | Ryan | C03C 17/256 |
| 2017/0233287 A1* | 8/2017 | Li | C03C 3/089 428/172 |
| 2017/0369369 A1* | 12/2017 | Ding | C03C 21/005 |
| 2018/0251399 A1* | 9/2018 | Koch, III | G02B 1/18 |
| 2019/0037850 A1* | 2/2019 | Hasegawa | D06M 11/83 |
| 2019/0373897 A1* | 12/2019 | Bookbinder | C03C 3/093 |
| 2021/0017399 A1* | 1/2021 | Palumbo | C09D 183/08 |
| 2021/0023252 A1* | 1/2021 | Furudate | A01N 59/20 |
| 2021/0154985 A1* | 5/2021 | Balakrisnan | A01P 1/00 |
| 2021/0246069 A1* | 8/2021 | Liang | C03C 8/06 |
| 2022/0073759 A1 | 3/2022 | Ryan et al. | |
| 2022/0144694 A1* | 5/2022 | Back | C09D 5/00 |
| 2022/0235232 A1* | 7/2022 | Zhang | A01N 59/16 |
| 2023/0157301 A1* | 5/2023 | Kashiwabara | C01G 3/00 106/15.05 |
| 2024/0287321 A1* | 8/2024 | Kim | C09D 133/08 |

FOREIGN PATENT DOCUMENTS

| | | | | |
|---|---|---|---|---|
| JP | 3-5345 A | | 1/1991 | |
| JP | H10218637 A | * | 8/1998 | |
| JP | 11-86757 A | | 3/1999 | |
| JP | 2014-511814 A | | 5/2014 | |
| JP | 2014237227 A | * | 12/2014 | |
| JP | 2016-33109 A | | 3/2016 | |
| JP | 2017-25120 A | | 2/2017 | |
| JP | 2017-509727 A | | 4/2017 | |
| WO | WO-2016028554 A1 | * | 2/2016 | ............. C03C 3/091 |
| WO | WO-2022019244 A1 | * | 1/2022 | ............... A01P 1/00 |

OTHER PUBLICATIONS

Machine translation of JP 2014/237227 A.*
Machine translation of JP H10/218637 A.*
Extended European Search Report for European Application No. 21886436.1, dated Nov. 20, 2024.
Argentine Office Action for Argentine Application No. 20210102889, dated Dec. 17, 2024, with an English translation.
Taiwanese Office Action for Taiwanese Application No. 110131273, dated Jan. 15, 2025, with an English translation.
Chinese Office Action and Search Report for Chinese Application No. 202180070689.3, dated Feb. 27, 2025, with English translation of the Office Action.
Korean Office Action for Korean Application No. 10-2023-7017657, dated Mar. 27, 2025, with English translation.
International Search Report, issued in PCT/JP2021/040302, PCT/ISA/210, dated Jan. 25, 2022.
Written Opinion of the International Searching Authority, issued in PCT/JP2021/040302, PCT/ISA/237, dated Jan. 25, 2022.
Japanese Office Action for Japanese Application No. 2022-559454, dated Jul. 1, 2025, with English translation.
Chinese Office Action for Chinese Application No. 202180070689. 3, dated Feb. 14, 2026, with English translation.
Japanese Office Action for Japanese Application No. 2022-559454, dated Jan. 6, 2026, with English translation.
Japanese Office Action for Japanese Application No. 2022-559454, dated Apr. 28, 2026, with English translation.
Korean Office Action for Korean Application No. 10-2023-7017657, dated Mar. 27, 2026, with English translation.

* cited by examiner

Cu(NO3)2

Cu mapping

GLASS BODY

TECHNICAL FIELD

The present invention relates to a glass body and a method for producing the same.

BACKGROUND ART

Glass bodies obtained by performing antibacterial or antiviral treatment on the surface of a glass plate have been proposed due to recent social conditions (e.g., Patent Literature 1).

CITATION LIST

Patent Literature

Patent Literature 1: JP 2014-511814A

SUMMARY OF INVENTION

Technical Problem

However, such a glass body does not have sufficient antibacterial function, and there is demand for further improvement. The present invention was made to address this problem, and it is an object thereof to provide a glass body that has high antibacterial performance, and a method for producing the same.

Solution to Problem

Item 1: A glass body including:
a plate-like glass plate having a first surface and a second surface; and
an antibacterial film that is formed on the first surface and in which copper ions are dispersed.
Item 2: The glass body according to Item 1,
in which the antibacterial film does not contain copper particles or copper compound particles with an outer diameter of 100 nm or more.
Item 3: The glass body according to Item 1 or 2,
in which the antibacterial film contains at least one of a silicon oxide, zirconia, titania, and alumina as a main component.
Item 4: The glass body according to Item 3,
in which the antibacterial film contains a silicon oxide as the main component, and
a network structure of Si and O of the antibacterial film contains the copper ions.
Item 5: The glass body according to any one of Items 1 to 4,
in which the antibacterial film contains the copper ions in an amount of 1 to 40 mass % with respect to a main component that constitutes the antibacterial film.
Item 6: The glass body according to any one of Items 1 to 5,
in which the antibacterial film has a film thickness of 20 to 500 nm.
Item 7: The glass body according to any one of Items 1 to 6,
in which, when the maximum thickness of the antibacterial film is Dmax and the minimum thickness of the antibacterial film is Dmin, Dmax/Dmin≤7 is satisfied.

Item 8: The glass body according to Item 7,
in which a portion of the antibacterial film with a thickness of the Dmin is located at an end portion of the glass plate.
Item 9: The glass body according to any one of Items 1 to 8,
in which, when a thickness of the antibacterial film is D1 and a thickness of the antibacterial film obtained after the glass body is heated at 600° C. is D2, D2/D1>0.8 is satisfied.
Item 10: The glass body according to any one of Items 1 to 9,
in which the antibacterial film contains an acidic oxide serving as a network former.
Item 11: The glass body according to any one of Items 1 to 10,
in which the antibacterial film contains boron.
Item 12: The glass body according to Item 11,
in which the antibacterial film contains the boron in an amount of 0.1 to 10 mass % with respect to a main component that constitutes the antibacterial film.
Item 13: The glass body according to any one of Items 1 to 12,
in which after the glass body is immersed in water for 16 hours, an elution amount of the copper ions is 20 mass % or less of the copper ions contained therein before the immersion.
Item 14: The glass body according to any one of Items 1 to 13,
in which the glass body has a visible light transmittance of 90% or more.
Item 15: The glass body according to any one of Items 1 to 14,
in which the antibacterial film has a surface roughness Ra of less than 120 nm.
Item 16: The glass body according to any one of Items 1 to 15,
in which the glass body has a haze ratio of 3% or less.
Item 17: The glass body according to any one of Items 1 to 16, further including:
an anti-fingerprint layer formed on at least a portion of the antibacterial film.
Item 18: A method for producing a glass body, including:
producing a coating liquid by adding a copper salt and boric acid to a solution containing silicon alkoxide;
applying the coating liquid to at least one surface of a glass plate; and
heating the glass plate to which the coating liquid has been applied to a predetermined temperature or higher.

Advantageous Effects of Invention

According to the present invention, it is possible to provide a glass body having high antibacterial performance.

DESCRIPTION OF EMBODIMENTS

Figure 1:
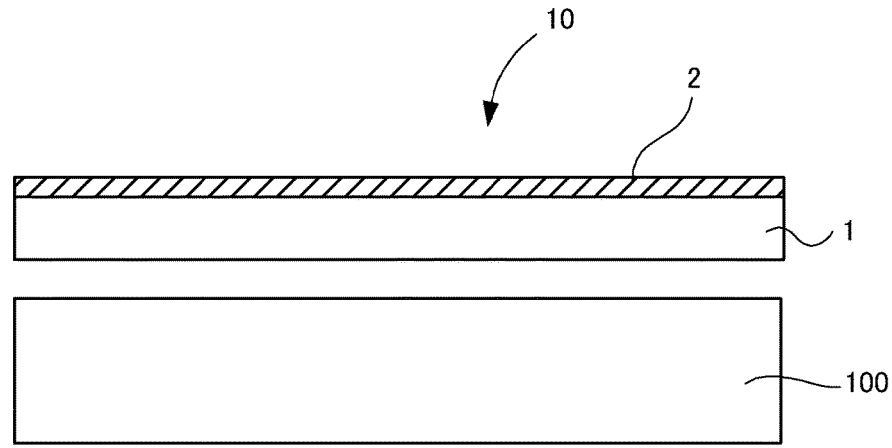
FIG. 1 is a cross-sectional view showing an embodiment in which a glass body according to the present invention is applied to a cover member.

Hereinafter, an embodiment in which a glass body according to the present invention is applied to a cover member will be described with reference to the drawings. The cover member according to the present embodiment is configured to protect a member to be protected, such as a display, a keyboard, or an electronic blackboard, while allowing this member to be seen from the outside. Note that the term "display" encompasses typical desktop displays and also displays for use in various devices, such as mobile PCs, tablet PCs, and in-vehicle devices such as car navigation systems. FIG. 1 is a cross-sectional view of the cover member.

As shown in FIG. 1, a cover member 10 according to the present embodiment includes a glass plate 1 having a first surface and a second surface, and an antibacterial film 2 layered on the first surface of the glass plate 1. The cover member 10 is disposed covering a member 100 to be protected that has been described above. In this case, the glass plate 1 is disposed with its second surface facing the member 100 to be protected, and the antibacterial film 2 is disposed facing outward. A more detailed description will be given below.

1. Glass Plate

The glass plate 1 can be made of general-purpose soda-lime glass, borosilicate glass, aluminosilicate glass, clear glass, green glass, UV green glass, heat absorbing glass, privacy glass, alkali-free glass, or other types of glass, for example. Also, the glass plate 1 can be float glass formed using a float process. Use of such a glass plate is not limited to the cover member 10 of the present embodiment, and such a glass plate can be used for all glass bodies according to the present invention. Also, the float process makes it possible to obtain a glass plate 1 having a flat and smooth surface. However, the glass plate 10 may have recesses and protrusions on its main surface, and may be made of figured glass, for example. Figured glass can be formed using a process called a roll out process. Figured glass that is formed using this production process usually has periodic recesses and protrusions in one direction along the main surface of the glass plate.

In the float process, molten glass is continuously supplied onto a molten metal such as molten tin, and the supplied molten glass is made to flow over the molten metal and thereby formed into a strip-like shape. The thus formed glass is called a "glass ribbon".

The glass ribbon is cooled as it moves downstream, and the cooled and solidified glass ribbon is raised from the molten metal by rollers. Then, the glass ribbon is transported to an annealing lehr by rollers, annealed, and then cut. A float glass plate can be obtained in this manner. Here, a surface of the float glass plate that has been in contact with the molten metal is referred to as the "bottom surface", and the opposite surface is referred to as the "top surface". The bottom surface and the top surface may be unpolished. Note that since the bottom surface has been in contact with the molten metal, in the case where the molten metal is tin, the concentration of tin oxide contained in the bottom surface is higher than the concentration of tin oxide contained in the top surface. In the present embodiment, the first surface of the glass plate 1 corresponds to the bottom surface, and the second surface thereof corresponds to the top surface.

It is known that, since the glass ribbon is transported by the rollers after being raised from the molten metal, the rollers cause scratches, or so-called microcracks, on the bottom surface, that is, the first surface. Therefore, in general, the bottom surface of a float glass plate has more scratches than the top surface.

Although the thickness of the glass plate 1 is not particularly limited, a thin glass plate is better for weight reduction.

The thickness of the glass plate 1 is preferably 0.3 to 3 mm, and more preferably 0.6 to 2.5 mm, for example. The reason for this is that, if the glass plate 10 is excessively thin, the strength is reduced, while if the glass plate 1 is excessively thick, the member 100 to be protected may be distorted when seen through the cover member 10.

The glass plate 1 typically may be a flat plate, but may also be a bent plate. In particular, in the case where the member to be protected has a non-flat surface shape such as a curved surface, the glass plate 1 preferably has a main surface with a non-flat surface shape that fits the non-flat surface shape of the member to be protected. In this case, the entire glass plate 1 may be bent so as to have a certain curvature, or the glass plate 1 may be locally bent. The main surface of the glass plate 1 may be constituted by, for example, a plurality of flat surfaces being connected via a curved surface. The radius of curvature of the glass plate 1 can be 5,000 mm or less, for example. The lower limit value of this radius of curvature can be 10 mm or more, for example, but a locally bent portion, in particular, may have an even smaller radius of curvature, which can be 1 mm or more, for example.

A glass plate having the following composition can also be used for a cover member. Hereinafter, unless otherwise specified, "%" as used when indicating the amounts of components of the glass plate 1 means "mol %" in all instances. Also, in this specification, the wording "substantially composed of" means that the total content of listed components accounts for 99.5 mass % or more, preferably 99.9 mass % or more, and more preferably 99.95 mass % or more. The wording "substantially does not contain" means that the content of the component in question is 0.1 mass % or less, and preferably 0.05 mass % or less.

Based on the composition (hereinafter also referred to as "SL in the narrow sense", or simply as "SL") of float plate glass, which is widely used as a composition of glass that is suitable for producing a glass plate using the float process, the inventors of the present invention have conducted a study to find a composition with which chemical strengthening properties of the SL in the narrow sense can be improved, while enabling $T_2$, $T_4$, and other characteristics to approximate as closely as possible to those of the SL in the narrow sense, within a composition range that is considered by a person skilled in the art to be soda lime silicate glass (hereinafter also referred to as "SL in the broad sense") that is suitable for the float process, or more specifically, within the following mass % range:

SiO$_2$: 65% to 80%
Al$_2$O$_3$: 0% to 16%
MgO: 0% to 20%
CaO: 0% to 20%
Na$_2$O: 10% to 20%, and
K$_2$O: 0% to 5%.

Hereinafter, components included in the glass composition of the glass plate 1 will be described.

SiO$_2$

SiO$_2$ is a main component constituting the glass plate 1. An excessively low SiO$_2$ content results in a decrease in chemical durability, such as water resistance, and heat resistance of glass. On the other hand, an excessively high SiO$_2$ content results in an increase in the viscosity of the glass plate 1 at high temperatures, making it difficult to melt and form the glass plate 1. Therefore, an appropriate range of the SiO$_2$ content is 66 to 72 mol %, and preferably 67 to 70 mol %.

$Al_2O_3$ $Al_2O_3$ is a component for improving the chemical durability, such as water resistance, of the glass plate 1 and furthermore facilitating the movement of alkali metal ions in the glass, thereby increasing the surface compressive stress after chemical strengthening and increasing the depth of the stress layer. On the other hand, an excessively high $Al_2O_3$ content results in an increase in the viscosity of the glass melt, thereby increasing $T_2$ and $T_4$ and degrading the clarity of the glass melt, and consequently, making it difficult to produce a high-quality glass plate.

Therefore, an appropriate range of the $Al_2O_3$ content is 1 to 12 mol %. The $Al_2O_3$ content is preferably 10 mol % or less and preferably 2 mol % or more.

MgO

MgO is an essential component that improves the meltability of glass. In order to achieve this effect, it is preferable that MgO is added to this glass plate 1. Furthermore, if the MgO content is less than 8 mol %, the surface compressive stress after chemical strengthening decreases, and the depth of the stress layer thus is likely to be small. On the other hand, if the MgO content is increased to more than a suitable amount, strengthening performance that is obtained through chemical strengthening degrades; in particular, the depth of the surface compressive stress layer drastically decreases. Although this adverse effect of MgO is the smallest compared with those of all the other alkaline earth metal oxides, the MgO content in this glass plate 1 is 15 mol % or less. Furthermore, a high MgO content increases $T_2$ and $T_4$ and degrades the clarity of this glass melt, thereby making it difficult to produce a high-quality glass plate.

Therefore, the MgO content in this glass plate 1 is within a range of 1 to 15 mol %, and preferably 8 mol % or more and 12 mol % or less.

CaO

CaO has the effect of reducing the viscosity at high temperatures; however, an extremely high CaO content that exceeds a suitable range is likely to devitrify the glass plate 1 and inhibits the movement of sodium ions in the glass plate 1. In the case where CaO is not contained, the surface compressive stress after chemical strengthening is likely to decrease. On the other hand, if CaO is contained in an amount of more than 8 mol %, the surface compressive stress after chemical strengthening markedly decreases, the depth of the compressive stress layer markedly decreases, and the glass plate 1 is likely to be devitrified.

Therefore, an appropriate range of the CaO content is 1 to 8 mol %. The CaO content is preferably 7 mol % or less and preferably 3 mol % or more.

SrO, BaO

SrO and BaO significantly reduce the viscosity of the glass plate 1, and when contained in a small amount, SrO and BaO more markedly have the effect of reducing the liquid phase temperature T L than CaO. However, even when added in a very small amount, SrO and BaO markedly hinder the movement of sodium ions in the glass plate 1, significantly reduce the surface compressive stress, and considerably reduce the depth of the compressive stress layer.

Therefore, it is preferable that this glass plate 1 substantially does not contain SrO and BaO.

$Na_2O$ $Na_2O$ is a component for increasing the surface compressive stress and increasing the depth of the surface compressive stress layer, due to sodium ions being replaced by potassium ions. However, if the $Na_2O$ content is increased to more than a suitable amount, stress relaxation during chemical strengthening treatment surpasses generation of the surface compressive stress due to ion exchange during chemical strengthening treatment, and as a result, the surface compressive stress is likely to decrease.

Also, while $Na_2O$ is a component for improving meltability and reducing $T_4$ and $T_2$, an excessively high $Na_2O$ content results in a significant decrease in water resistance of the glass. If the $Na_2O$ content in the glass plate 1 is 10 mol % or more, a sufficient effect of reducing $T_4$ and $T_2$ can be obtained, and if the $Na_2O$ content is more than 16 mol %, the surface compressive stress markedly decreases due to the stress relaxation.

Therefore, an appropriate range of the $Na_2O$ content in the glass plate 1 of the present embodiment is 10 to 16 mol %. The $Na_2O$ content is preferably 12 mol % or more, and more preferably 15 mol % or less.

$K_2O$ $K_2O$, like $Na_2O$, is a component that improves the meltability of glass. Also, in a low $K_2O$ content range, the ion exchange rate during chemical strengthening increases, and the depth of the surface compressive stress layer thus increases, while, on the other hand, the liquid phase temperature T L of the glass plate 1 decreases. Therefore, it is preferable that $K_2O$ is contained in a small amount.

On the other hand, although the effect of reducing T 4 and $T_2$ of $K_2O$ is smaller than that of $Na_2O$, a high $K_2O$ content inhibits clarification of the glass melt. Furthermore, the higher the $K_2O$ content, the lower the surface compressive stress after the chemical strengthening. Therefore, an appropriate range of the $K_2O$ content is 0 to 1 mol %.

$Li_2O$ $Li_2O$, when contained even in a small amount, significantly reduces the depth of the compressive stress layer. Also, in the case where a glass article containing $Li_2O$ is chemically strengthened in a molten salt of potassium nitrate alone, the molten salt deteriorates significantly faster than in the case of a glass article that does not contain $Li_2O$. Specifically, in the case where the glass articles are repeatedly chemically strengthened using the same molten salt, surface compressive stress generated in the glass surface of the glass article containing $Li_2O$ decreases in the fewer cycles. Therefore, although the glass plate 1 of the present embodiment may contain $Li_2O$ in an amount of 1 mol % or less, it is preferred that the glass plate 1 substantially does not contain $Li_2O$.

$B_2O_3$ $B_2O_3$ is a component that lowers the viscosity of the glass plate 1 and improves meltability. However, if the $B_2O_3$ content is excessively high, phase separation is likely to occur in the glass plate 1, resulting in a decrease in the water resistance of the glass plate 1. Also, a compound formed of $B_2O_3$ and an alkali metal oxide may volatilize and cause damage to a refractory material of a glass melting chamber. Furthermore, if $B_2O_3$ is contained, the depth of the compressive stress layer formed by chemical strengthening becomes smaller. Therefore, an appropriate $B_2O_3$ content is 0.5 mol % or less. In the present invention, it is more preferable that the glass plate 1 substantially does not contain $B_2O_3$.

$Fe_2O_3$

Usually, Fe is present as $Fe^{2+}$ or $Fe^{3+}$ in glass, and functions as a colorant. $Fe^{3+}$ is a component that improves the ultraviolet absorption performance of glass, and $Fe^{2+}$ is a component that improves heat absorption performance. In the case where the glass plate 1 is to be used as a cover glass for a display, its coloration is required to be inconspicuous, and therefore, a lower Fe content is preferred. However, Fe from industrial raw materials is often inevitably mixed in glass. Therefore, the content of iron oxide in terms of $Fe_2O_3$ is preferably 0.15 mass % or less, more preferably 0.1 mass % or less, and even more preferably 0.02 mass % or less, where the glass plate 1 as a whole is taken as 100 mass %.

$TiO_2$ $TiO_2$ is a component that reduces the viscosity of the glass plate 1 and also increases the surface compressive stress generated by chemical strengthening, but $TiO_2$ may add a yellow color to the glass plate 1. Therefore, an appropriate $TiO_2$ content is 0 to 0.2 mass %. Furthermore, $TiO_2$ from commonly used industrial raw materials is inevitably mixed in the glass plate 1 and thus may be contained therein in an amount of approximately 0.05 mass %. With a content like this, $TiO_2$ does not add any color to glass and may be contained in the glass plate 1 of the present embodiment.

$ZrO_2$

Especially when producing a glass plate using the float process, $ZrO_2$ may be mixed in the glass plate 1 from refractory bricks constituting a glass melting furnace, and the $ZrO_2$ content in that case is known to be approximately 0.01 mass %. On the other hand, $ZrO_2$ is a component that improves the water resistance of glass and increases the surface compressive stress generated by chemical strengthening. However, a high $ZrO_2$ content may cause an increase in working temperature $T_4$ and a sharp increase in liquid phase temperature T L and, in the production of a glass plate using the float process, makes it likely that crystals containing precipitated Zr remain in the produced glass as foreign matter. Therefore, an appropriate $ZrO_2$ content is 0 to 0.1 mass %.

$SO_3$

In the float process, a sulfate such as sodium sulfate ($Na_2SO_4$) is widely used as a clarifying agent. The sulfate decomposes in the molten glass and generates a gas component, and thus, degassing of the glass melt is promoted, but a portion of the gas component dissolves and remains in the glass plate 1 as $SO_3$. It is preferable that the $SO_3$ content in the glass plate 1 of the present invention is 0 to 0.3 mass %.

$CeO_2$ $CeO_2$ is used as a clarifying agent. $CeO_2$ produces 2 gas in the molten glass, and therefore, $CeO_2$ contributes to degassing. On the other hand, an excessively high $CeO_2$ content causes the glass to be discolored to yellow. Therefore, the $CeO_2$ content is preferably 0 to 0.5 mass %, more preferably 0 to 0.3 mass %, and even more preferably 0 to 0.1 mass %.

$SnO_2$

It is known that, in a glass plate that is formed using the float process, tin from a tin bath has diffused into a surface that has been in contact with the tin bath during the formation of the glass plate, and the diffused tin is present as $SnO_2$. Also, $SnO_2$ mixed with glass raw materials contributes to degassing. The $SnO_2$ content in the glass plate 1 of the present invention is preferably 0 to 0.3 mass %.

Other Components

It is preferable that the glass plate 1 according to the present embodiment is substantially composed of the above-listed components. However, the glass plate 1 according to the present embodiment may also contain components other than the above-listed components as long as the content of each such component is preferably less than 0.1 mass %.

Examples of the components that can be contained include $As_2O_5$, $Sb_2O_5$, Cl, and F that may be added for the purpose of degassing the molten glass in addition to $SO_3$ and $SnO_2$ described above. However, it is preferable that $As_2O_5$, $Sb_2O_5$, Cl, and F are not added because of their significant adverse effects on the environment and for other reasons. Other examples of the components that can be contained are ZnO, $P_2O_5$, $GeO_2$, $Ga_2O_3$, $Y_2O_3$, and $La_2O_3$. Components other than the above that are derived from industrially used raw materials can also be contained as long as the content of each such component does not exceed 0.1 mass %. Since these components may be appropriately added as necessary, or inevitably mixed in, it is possible that the glass plate 1 of the present embodiment substantially does not contain these components.

Density (Specific Gravity): d

With the above-described composition, the density of the glass plate 1 according to the present embodiment can be reduced to 2.53 $g \cdot cm^{-3}$ or less, or 2.51 $g \cdot cm^{-3}$ or less, or even to 2.50 $g \cdot cm^{-3}$ or less in certain cases.

In the float process or the like, if there is a significant difference in density between product types of glass, the molten glass having the higher density may stagnate in a bottom portion of the melting furnace when changing the product type of glass that is produced, and therefore, the product type cannot be changed smoothly. The density of soda-lime glass that is currently mass-produced using the float process is approximately 2.50 $g \cdot cm^{-3}$. For this reason, in the context of mass production using the float process, it is preferable that the density of the glass plate 1 is close to the aforementioned values, or specifically is 2.45 to 2.55 $g \cdot cm^{-3}$, more preferably 2.47 to 2.53 $g \cdot cm^{-3}$, and even more preferably 2.47 to 2.50 $g \cdot cm^{-3}$.

Elasticity: E

A glass substrate may be warped when subjected to chemical strengthening that involves ion exchange. In order to prevent the warpage, it is preferable that the glass plate 1 has a high elasticity. According to the present invention, the elasticity (Young's modulus: E) of the glass plate 1 can be increased to 70 GPa or more, or even to 72 GPa or more.

Hereinafter, chemical strengthening of the glass plate 1 will be described.

Chemical Strengthening Conditions and Compressive Stress Layer

The glass plate 1 according to the present invention can be chemically strengthened by performing an ion exchange treatment in which the glass plate 1 that contains sodium is brought into contact with a molten salt that contains monovalent cations, preferably potassium ions, that have a larger ionic radius than sodium ions, and sodium ions in the glass plate 1 are replaced with the monovalent cations. A compressive stress layer in which compressive stress is applied is thus formed in the surface of the glass plate 1.

A typical example of the molten salt is potassium nitrate. Although a mixed molten salt of potassium nitrate and sodium nitrate may be used, a molten salt of potassium nitrate alone is preferable because it is difficult to control the concentration of the mixed molten salt.

The surface compressive stress and the depth of the compressive stress layer of a tempered glass article can be controlled by adjusting not only the glass composition of the article but also the temperature of the molten salt during the ion exchange treatment and the treatment time.

A tempered glass article with an extremely high surface compressive stress and an extremely deep depth of the compressive stress layer can be obtained by bringing the above-described glass plate 1 into contact with a potassium nitrate molten salt. Specifically, a tempered glass article in which the surface compressive stress is 700 MPa or more and the depth of the compressive stress layer is 20 μm or more can be obtained, and furthermore, a tempered glass article in which the depth of the compressive stress layer is 20 μm or more and the surface compressive stress is 750 MPa or more can be obtained as well.

2. Antibacterial Film

Next, the antibacterial film 2 will be described. The antibacterial film 2 contains a silicon oxide, which is an oxide of Si, and preferably contains a silicon oxide as a main component. The antibacterial film 2 containing a silicon oxide as the main component is suitable for reducing the refractive index of the film and suppressing the reflectance of the film. However, the antibacterial film 2 may contain a component other than a silicon oxide, and may contain a component that partially contains a silicon oxide. Note that the antibacterial film 2 may contain zirconia, titania, alumina, or the like as the main component, for example, in addition to a silicon oxide. However, a case where the antibacterial film 2 containing a silicon oxide as the main component will be described below as a representative example. Note that the "main component" herein refers to a component contained in the antibacterial film in an amount of 50 mass % or more.

The component that partially contains a silicon oxide may be, for example, a component that contains a portion composed of a silicon atom and an oxygen atom and in which an atom other than a silicon atom and an oxygen atom, a functional group, or the like is bound to the silicon atom or oxygen atom of this portion. Examples of the atom other than a silicon atom and an oxygen atom include a nitrogen atom, a carbon atom, a hydrogen atom, and metal elements that will be described in the next paragraph. Examples of the functional group include organic groups that will be described as R in a paragraph below. This component is not a silicon oxide in a strict sense because it is not composed only of a silicon atom and an oxygen atom. However, in describing the characteristics of the antibacterial film 2, treating a silicon oxide portion that is composed of a silicon atom and an oxygen atom as a "silicon oxide" is appropriate and is also consistent with usage in the field. In this specification, the silicon oxide portion is also treated as a silicon oxide. As is clear from the above description, the atomic ratio between silicon atoms and oxygen atoms in a silicon oxide need not be stoichiometric (1:2).

The antibacterial film 2 can contain a metal oxide other than a silicon oxide, or specifically, a metal oxide component or a metal oxide portion that contains an element other than silicon. The metal oxide that can be contained in the antibacterial film 2 is not particularly limited, and may be an oxide of at least one metal element selected from the group consisting of Al, Ti, Zr, Ta, Nb, Nd, La, Ce, and Sn, for example. The antibacterial film 2 may contain an inorganic compound component other than an oxide, examples of which include a nitride, a carbide, and a halide, and may contain an organic compound component.

A metal oxide such as a silicon oxide can be formed from a hydrolyzable organic metal compound. An example of a hydrolyzable silicon compound is a compound represented by Formula (1):

$$R_n SiY_{4-n} \tag{1}$$

where R is an organic group containing at least one selected from an alkyl group, a vinyl group, an epoxy group, a styryl group, a methacryloyl group, and an acryloyl group; Y is a hydrolyzable organic group that is at least one selected from an alkoxy group, an acetoxy group, an alkenyloxy group, and an amino group, or a halogen atom, which is preferably Cl; and n is an integer from 0 to 3 and is preferably 0 or 1.

R is preferably an alkyl group, for example, an alkyl group having 1 to 3 carbon atoms, and a methyl group is particularly preferable. Y is preferably an alkoxy group, for example, an alkoxy group having 1 to 4 carbon atoms, and a methoxy group and an ethoxy group are particularly preferable. Two or more compounds represented by the formula above may also be used in combination. As an example of this combination, a tetraalkoxysilane, where n is 0, and a monoalkyltrialkoxysilane, where n is 1, may be used together.

A compound represented by Formula (1) after hydrolysis and polycondensation forms a network structure in which silicon atoms are bonded to one another via oxygen atoms. In this structure, the organic groups represented by R are contained in a state of being directly bonded to silicon atoms.

The thickness of the antibacterial film 2 is preferably 20 to 500 nm, more preferably 30 to 200 nm, and particularly preferably 40 to 80 nm, for example.

The antibacterial film 2 contains copper in order to have an antibacterial function. Specifically, copper is ionically bonded to the network structure of Si and O. Copper is dispersed on the entire surface of the antibacterial film 2 in this manner. The content of copper ions in the antibacterial film 2 is preferably 1 to 40 mass % and more preferably 5 to 25 mass % with respect to the main component (e.g., a silicon oxide, zirconia, titania, or alumina) that constitutes the antibacterial film 2.

Also, the antibacterial film 2 may contain an acidic oxide, which serves as a network former, such as a boron or phosphorus. Note that the "network former" in this embodiment refers to an oxide of an element that contributes to the formation of a glass network. As will be described later, this element comes from a part of boron or phosphorus contained in a coating liquid used in production remaining in the antibacterial film 2. The content of boron or phosphorus remaining in the antibacterial film 2 is preferably 0.1 to 10 mass % and more preferably 0.2 to 2 mass %, for example, with respect to the main component (e.g., a silicon oxide, zirconia, titania, or alumina) that constitutes the antibacterial film 2. Note that if the antibacterial film contains a large amount of boron, the abrasion resistance of the antibacterial film 2 may be reduced.

3. Method for Forming Antibacterial Film

There is no particular limitation on the method for forming the antibacterial film 2, and the antibacterial film 2 can be formed in the following manner, for example. First, a material that constitutes the above-described matrix, for example, tetraethoxysilane is dissolved to form a solution under an acidic condition, and thus, a precursor solution is produced. Also, a coating liquid for an antibacterial film is produced by adding, to this precursor solution, a copper salt such as copper nitrate or copper chloride and adding boric acid or phosphoric acid as needed. The amount of added copper salt in this coating liquid is preferably 0.1 to 5 mass %, and more preferably 0.2 to 2 mass %, for example. If the concentration of the copper salt is excessively high, the visible light transmittance of the cover member 10 may be reduced and the haze thereof may be increased. On the other hand, if the concentration of the copper salt is excessively low, the antibacterial function may not be realized. Furthermore, the amount of added boric acid or phosphoric acid in this coating liquid is preferably to 5 mass %, and more preferably 0.05 to 1 mass %, for example.

Note that it is preferable to use copper nitrate as a copper salt from the viewpoint of suppressing the reduction of copper ions. On the other hand, if copper chloride is added as a copper salt, metallic copper is likely to be precipitated in the antibacterial film, and the heating temperature cannot be raised, and the hardness of the antibacterial film 2 may also be lower than that when a nitrate is used. Therefore, it is preferable to add a copper salt together with a salt of counter ions, which has a low effect of reducing copper ions. Examples of such salts include nitrates and carbonates, and it is particularly preferable to use nitrates.

Then, the coating liquid is applied to the first surface of the cleaned glass plate 1. Although there is no particular limitation on the application method, flow coating, spray coating, spin coating, or the like can be used, for example. After that, the applied coating liquid is dried at a predetermined temperature (e.g., 80° C. to 120° C.) in an oven or the like in order to, for example, volatilize an alcohol and ester compounds, which are produced through a reaction between boron or phosphoric acid and the alcohol, from the solution, and then sintered at a predetermined temperature (e.g., 200° C. to 500° C.) for the purpose of hydrolysis and organic chain decomposition, for example. Thus, an antibacterial film 2 can be obtained.

Here, the effect of adding boron or phosphorus will be described. The following describes a case where boron is added as boric acid in particular. If copper nitrate and boric acid are added to the precursor, copper of copper nitrate is dispersed as copper ions in the solution, and boron of boric acid is covalently bonded to the network structure of Si and O. Then, when the applied coating liquid is heated, boron in the network structure is substituted by copper, and copper is ionically bonded to the network structure. The dispersion of copper in the entire antibacterial film 2 is facilitated in this manner. The substituted boron is then esterified and volatilizes from the coating liquid. This increases the number of gaps in the network structure, and oxygen is likely to pass therethrough. Note that not all boron is esterified and volatilized, but some boron remains in the network structure.

Copper and oxygen are ionically bonded in the network structure, and the degree of freedom of bond angles is large, and thus a film will be greatly shrunk due to heating. As a result, the sintered antibacterial film 2 can be made compact.

Figure 2:
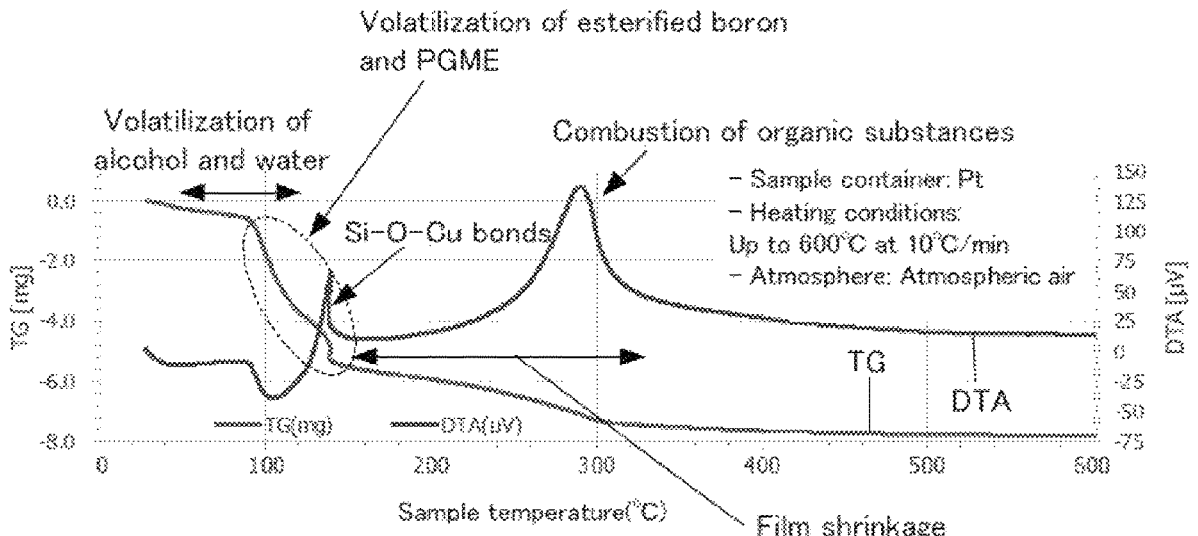
FIG. 2 is a graph showing the result of thermal analysis when a coating liquid is heated.

Here, an example of thermal analysis in the heating of the coating liquid will be described. FIG. 2 shows a weight reduction (TG) and differential thermal analysis (DTA) obtained when the coating liquid is applied to the glass plate and then heated to 600° C. at 10° C./min. The coating liquid described here as an example contains propylene glycol monomethyl ether (PGME), purified water, copper nitrate, boric acid, and ethyl orthosilicate.

As shown in FIG. 2, when the temperature is increased, alcohol and water volatilize at a temperature of about 100° C. or lower, and then PGME and esterified boron volatilize at a temperature of about 120° C. Accordingly, the weight of a film drastically decreases, and thus it can be seen that the film shrinks. As a result of the coating liquid containing boron in this manner, esterified boron volatilizes, and thus it is possible to reduce the amount of residual organic substances in the antibacterial film. On the other hand, if boron is not contained, hardening of the film is started at a temperature of about 100° C. at which alcohol and water volatilize. However, the volatilization temperature of esterified boron is about 120° C. or higher, and thus the film is hardened at a comparatively high temperature due to the addition of boric acid, resulting in a delay in the timing of hardening.

Also, due to copper being contained, it is possible to reduce the combustion temperature of organic substances. As shown in FIG. 2, for example, organic substances in this coating liquid burn at a peak temperature of about 280° C., and the weight of the film is reduced, and thus it can be seen that the film shrinks. When boron and copper are added to the coating liquid in this manner, the temperatures at which two instances of shrinkage of the film are started are close to each other, and thus the overall degree of film shrinkage can be increased. As a result, it is possible to make the antibacterial film 2 compact, and to firmly immobilize copper in the network structure. Therefore, it is possible to suppress elution of copper from the antibacterial film 2. On the other hand, if the coating liquid does not contain copper, the combustion temperature of organic substances exceeds 400° C., and the time taken from the initial film shrinkage to the combustion temperature of organic substances is extended. As a result, the network structure is immobilized due to the initial film shrinkage, and even if organic substances burn at a temperature of about 400° C., it is highly likely that film shrinkage will not proceed.

The wording "being compact" in this specification refers to D2/D1>0.8 holding true, where D2 is the thickness of the antibacterial film 2 after the cover member 10 has been heated at a temperature of 600° C. and D1 is the thickness of the antibacterial film 2 before heating, for example. That is, the wording "being compact" in this specification means that a network structure is formed to such an extent that the antibacterial film does not shrink by 20% or more even when the cover member 10 is heated at high temperatures. Note that there is no particular limitation on the positions where the thicknesses D1 and D2 are measured, and these positions are located at the same position or in the vicinity thereof on the antibacterial film 2.

If boron remains in the heated antibacterial film 2 as described above, boron (BO—) has the effect of attracting copper ions, and thus it is possible to inhibit copper ions from aggregating into crystals such as copper oxides. Note that, if the coating liquid contains boron or phosphorus, the above-described effect can be obtained. However, even if the coating liquid does not contain boron or phosphorus, the film shrinks to some extent. Also, sintering the coating liquid at a temperature higher than the above-described temperature makes the resulting film compact.

If float coating is applied, the coating liquid is applied to the entire glass plate 1 due to the coating liquid flowing from an upper end toward a lower end of the glass plate 1, and thus the antibacterial film 2 is likely to be the thickest in the vicinity of the upper end of the glass plate 1 and the thinnest in the vicinity of the lower end. When the maximum thickness of the antibacterial film 2 is Dmax and the minimum thickness thereof is Dmin, in order to prevent the difference in thickness from increasing excessively, it is preferable that Dmax/Dmin 7 is satisfied.

4. Optical Properties of Cover Member

With regard to the optical properties of the cover member 10 provided with the antibacterial film 2 in the above-described manner, for example, visible light transmittance is preferably 85% or more, and more preferably 90% or more. Furthermore, the haze ratio of the cover member 10 is 20% or less, 15% or less, or particularly 10% or less, for example, or may optionally be 1% to 8% or even 1% to 6%.

Also, the gloss can be evaluated based on the specular gloss. The 60° specular gloss of the cover member 10 is 60% to 130%, 70% to 120%, or particularly 80% to 110%, for example. These specular gloss values were measured on the surface where the antibacterial film 2 was formed. Note that, in general, a cover member that exhibits gloss of 120% to 140% is used as a cover member for a display of an in-vehicle device such as a car navigation system.

Preferably, a relational expression (a), or more preferably a relational expression (b), holds between the 60° specular gloss G and the haze ratio H (%):

$$H \le -0.2G + 25 \qquad\qquad (a)$$

$$H \le -0.2G + 24.5 \qquad\qquad (b).$$

Note that, the gloss can be measured in conformity with "Method 3 (Specular gloss at 60 degrees)" of "Specular glossiness-Methods of measurement" in JIS Z 8741-1997, and the haze can be measured in conformity with JIS K 7136:2000.

5. Features

The cover member 10 according to the present embodiment can achieve the following effects. That is to say, as described above, copper ions are dispersed in the entire antibacterial film 2, and thus bacteria and copper ions are likely to come into contact with each other, and antibacterial performance can be easily achieved. As will be described later, the term "dispersion" as used herein indicates a state in which, when a portion of the antibacterial film 2 is divided into 1 μm×1 μm regions, copper ions are present in each region. Also, "copper ions" as used herein are not aggregates, and "dispersion" indicates that the antibacterial film 2 does not substantially contain copper aggregates with an outer diameter of 100 nm or more, in particular. Alternatively, when analysis is performed through EDX, for example, crystals (with an outer diameter of about 10 nm, for example) of copper or a copper compound are not substantially contained in the antibacterial film 2.

As described above, in the antibacterial film 2, copper ions are retained in the network structure, and antibacterial performance (or antivirus performance) is exhibited due to some copper ions being eluted to the surface of the antibacterial film 2. However, if the elution rate of copper ions is excessively high, antibacterial performance cannot be maintained for a long period of time. To address this, as described above, in the cover member 10 according to the present embodiment, the antibacterial film 2 is formed compact, and thus copper ions can be firmly retained in the network structure. In particular, because copper ions are small ions, most of the copper ions may elute over time unless the above-described network structure is compact. To address this, by producing the compact antibacterial film 2 as described above, copper ions can be firmly retained in the network structure, and it is possible to suppress the elution of copper ions from the antibacterial film 2. As a result, it is possible to maintain an antibacterial effect for a long period of time. As an index for maintaining such antibacterial performance, the amount of copper eluted after immersion of the cover member (the glass body) in water for 16 hours is preferably 40% or less and more preferably 20 mass % or less of copper before the immersion.

6. Variations

Although an embodiment of the present invention has been described above, the present invention is not limited to the above embodiment, and various modifications can be made without departing from the spirit of the present invention. Note that the following variations can be combined as appropriate.

6-1

It is possible to provide an antiglare function to the antibacterial film 2. The following method can be adopted as a method therefor, for example. When recesses and protrusions are first formed on a surface of the glass plate 1, it is also possible to form recesses and protrusions on the antibacterial film 2 that is to be layered thereon. Therefore, the antiglare function can be realized due to these recesses and protrusions.

The antibacterial film 2 preferably has a surface roughness Ra of 120 nm or less, and more preferably has a surface roughness Ra of 100 nm or less, for example. On the other hand, the antibacterial film 2 preferably has a surface roughness Ra of 20 nm or more, and more preferably has a surface roughness Ra of nm or more, for example. If the surface roughness Ra of the antibacterial film 2 is 20 nm or more and 120 nm or less in this manner, the antiglare function can be realized. Note that the surface roughness Ra is the arithmetic average roughness obtained from a roughness profile specified in JIS B0601: 2001. This holds true for the entire specification. Also, Rsm of the surface of the antibacterial film 2 is preferably more than 0 μm and 35 μm or less, more preferably 1 μm to 30 μm, and particularly preferably 2 μm to 20 μm. Rsm is the average length of roughness profile elements specified in JIS B 0601: 2001. An Rsm that is not excessively large is preferable for suppressing so-called "sparkle".

In order to form recesses and protrusions on the surface of the antibacterial film 2 as described above, recesses and protrusions need to be formed on the surface of the glass plate 1. In order to achieve that, the antibacterial film 2 can be layered on the bottom surface of the glass plate 1, for example.

It is possible to remove a layer with a high tin oxide concentration by performing etching on the bottom surface of the glass plate 1. Because tin oxide has a high refractive index, transmittance can be improved by removing this layer. Furthermore, as a result of the etching, fine recesses and protrusions with a predetermined surface roughness are formed on the bottom surface. The surface roughness Ra of the bottom surface is preferably 10 to 500 nm, more preferably 40 to 200 nm, and particularly preferably 50 to 150 nm, for example. When recesses and protrusions are formed on the bottom surface of the glass plate 1, it is possible to form antiglare recesses and protrusions on the antibacterial film 2 utilizing these recesses and protrusions.

Note that examples of a method for imparting a predetermined surface roughness to the glass plate 1 include surface treatment techniques such as frosting, sandblasting, and wet blasting. Frosting is a process of, for example, immersing the glass plate in a mixed solution of hydrogen fluoride and ammonium fluoride and chemically surface-treating its immersed surface, to thereby form recesses and protrusions on the surface of the glass plate. Sandblasting is a process of, for example, spraying a crystalline silicon dioxide powder, a silicon carbide powder, or the like against a surface of the glass plate using pressurized air, to thereby form recesses and protrusions on the surface of the glass plate. Also, typically, after recesses and protrusions have been formed as described above, the surface of the glass plate is chemically etched in order to adjust the surface shape. In this manner, cracks formed by sandblasting or the like can be removed. A method in which the glass plate, which is an object to be treated, is immersed in a solution that contains hydrogen fluoride as the main component is preferably used to perform the etching.

Wet blasting is a process of spraying a jet of a slurry obtained by uniformly stirring abrasive particles constituted by solid particles of alumina or the like with a liquid such as water, against a surface of the glass plate from a jet nozzle at a high speed using compressed air, to thereby form recesses and protrusions on the surface of the glass plate.

Note that, although recesses and protrusions are formed on the bottom surface of the glass plate 1 by etching the bottom surface in the above description, a configuration may also be adopted in which etching is performed on the top surface of the glass plate 1, and the antibacterial film 2 is layered on the top surface.

6-2

The following method may be used as a method for forming recesses and protrusions on the antibacterial film 2. That is, recesses and protrusions can be formed on the surface of the antibacterial film 2 due to the antibacterial film 2 containing microparticles.

The shape of the microparticles is not particularly limited, and is preferably a spherical shape. The microparticles may be substantially composed of spherical particles. However, a portion of the microparticles may have a shape other than a spherical shape, for example, a flat plate-like shape. The microparticles may be composed only of spherical particles. Here, a "spherical particle" refers to a particle in which the ratio of the longest diameter to the shortest diameter that pass through the center of gravity is 1 or more and 1.8 or less, and particularly 1 or more and 1.5 or less, and the surface of the particle is constituted by a curved surface. The spherical particles may have an average particle size of 5 nm to 200 nm, 10 nm to 100 nm, or particularly 20 nm to 60 nm. The average particle size of the spherical particles depends on the average of individual particle sizes, or specifically, average values of the above-described shortest and longest diameters, and it is desirable that the measurement is performed on 30 particles, or preferably 50 particles, based on an SEM image. Use of the microparticles can impart a suitable surface roughness Ra to the antibacterial film 2.

The material constituting the microparticles is not particularly limited, and preferably contains a metal oxide, or particularly a silicon oxide. However, the metal oxide may include an oxide of at least one metal element selected from the group consisting of Al, Ti, Zr, Ta, Nb, Nd, La, Ce, and Sn, for example.

Also, the microparticles may be phyllosilicate mineral particles. A phyllosilicate mineral contained in the phyllosilicate mineral particles is also referred to as "sheet silicate mineral". Examples of the phyllosilicate mineral include kaolin minerals such as kaolinite, dickite, nacrite, and halloysite; serpentines such as chrysotile, lizardite, and amesite; dioctahedral smectites such as montmorillonite and beidellite; trioctahedral smectites such as saponite, hectorite, and sauconite; dioctahedral micas such as muscovite, palagonite, illite, and celadonite; trioctahedral micas such as phlogopite, annite, and lepidolite; dioctahedral brittle micas such as margarite; trioctahedral brittle micas such as clintonite and anandite; dioctahedral chlorites such as donbassite; di, trioctahedral chlorites such as cookeite and sudoite; trioctahedral chlorites such as clinochlore and chamosite; pyrophyllites; talcs; dioctahedral vermiculites; and trioctahedral vermiculites. It is preferable that the phyllosilicate mineral particles contain a mineral belonging to smectites, kaolins, or talcs. Montmorillonite is preferable as a mineral belonging to smectites. Note that montmorillonite belongs to the monoclinic system, kaolins belong to the triclinic system, and talcs belong to the monoclinic system or the triclinic system.

This antibacterial film 2 can be formed in a similar manner to the above-described antibacterial film 2. That is to say, the antibacterial film 2 having recesses and protrusions on its surface can be formed by mixing a microparticle dispersion in the above-described coating liquid, applying the coating liquid to a surface of the glass plate, and then sintering the coating liquid.

6-3

A configuration is also possible in which an anti-fingerprint layer is formed on a surface of the antibacterial film 2. The formation of an anti-fingerprint film makes it easier to perform a swipe operation on the cover member 10 and also to wipe off dirt such as fingerprints.

The anti-fingerprint film can be formed in the following manner, for example. The anti-fingerprint film can have hydrophobic and oleophobic properties, or in other words, amphiphobic properties so as to minimize wetting of the cover member 10 by water and oil. Therefore, the wetting properties of a surface provided with the anti-fingerprint film are required to be such that not only the surface is hydrophobic, or in other words, the contact angle between the surface and water is preferably more than 90 degrees, but also the surface is oleophobic, or in other words, the contact angle between the surface and oil is preferably more than 50 degrees.

The anti-fingerprint film can be, for example, a film including a silane that contains an alkyl group and/or a fluoroalkyl group, for example, 3,3,3-trifluoropropyltrimethoxysilane or pentyltriethoxysilane.

The anti-fingerprint film may be a fluoro-based surface layer that is based on a compound having a hydrocarbon group, wherein the C—H bonds are partially, or preferably substantially completely, replaced by C—F bonds. Preferably, such a compound can be a perfluorohydrocarbon represented by the formula $(R_F)_n SiX_{4-n}$, for example, where $R_F$ represents a $C_1$ to $C_{22}$-alkylperfluorohydrocarbon or -alkylperfluoropolyether, or preferably a $C_1$ to $C_{10}$-alkylperfluorohydrocarbon or -alkylperfluoropolyether; n is an integer from 1 to 3; and X is a hydrolyzable group, for example, a halogen or an alkoxy group —OR, where R represents, for example, a linear or branched hydrocarbon having 1 to 6 carbon atoms. In this case, the hydrolyzable group X can, for example, react with a terminal OH group of a coating of a glass substrate, thereby binding to this group by forming a covalent bond. The perfluorohydrocarbon can be used to reduce the surface energy of the surface preferably because of the low polarity of the terminal fluoric surface bonding.

The anti-fingerprint film can be derived from, for example, a monolayer of a molecular chain with fluorine terminal groups, a fluoropolymer coating, or silicon oxide soot particles that have previously been provided with or treated with fluorine terminal groups.

The anti-fingerprint film can be applied to the surface through immersion, vapor deposition, spray coating, application with a roll or roller or a doctor blade, or thermal vacuum deposition or sputtering, and preferably through a liquid phase method, such as spraying, dip-coating, printing, roller coating, spin coating, or other suitable methods. Immersion or spray coating is particularly preferable. After a coating has been applied, it is cured at a suitable temperature for a suitable period of time.

The thickness of the anti-fingerprint film can be 50 to 1,000 nm, for example. If the anti-fingerprint film is excessively thick, there is a risk that the antibacterial performance will be inhibited. On the other hand, if the anti-fingerprint film is excessively thin, there is a risk that the anti-fingerprint performance will be reduced.

The anti-fingerprint film can be formed on the entire surface of the antibacterial film 2, but it can also be formed on a portion thereof. In the case where a portion of the cover member 10 is arranged on a member 100 to be protected that is used to perform a key touch operation like a keyboard, for example, it is possible that the anti-fingerprint film is not formed on the keys, and the anti-fingerprint layer is formed only on the other regions, for example, a region on which the swipe operation is performed. Note that the anti-fingerprint layer can not only suppress the adhesion of fingerprints but also prevent the adhesion of dirt.

6-4

It is possible to form a mask layer on a portion of the glass plate 1 so that, in the portion where the mask layer is formed, the member 100 to be protected can be made invisible from the outside. A configuration is possible in which a mask layer is formed on the periphery of the glass plate 1 so that, in the periphery of the cover member 10, the member 100 to be protected can be made invisible from the outside, for example. With this configuration, for example, components of the member 100 to be protected, such as wiring and brackets, can be made invisible from the outside. As the material for the mask layer, any material that can block the view from the outside can be selected as appropriate for respective embodiment, and, for example, it is possible to use a ceramic material of a dark color such as black, brown, gray, or dark blue. It is also possible to attach a sheet member.

In the case where a black ceramic material is selected as the material for the mask layer, for example, the black ceramic material is layered on a surface of the cover member 10 through screen printing or the like, the surface being opposite to the surface on which the antibacterial film 2 is formed, and the layered ceramic material is heated together with the glass plate. When the ceramic material has cured, the mask layer is completed. Note that various materials can be used as the ceramic material used for the mask layer, and, for example, a ceramic material with the composition shown in Table 1 below can be used for the mask layer.

TABLE 1

|  | | First and second colored ceramic pastes |
| --- | --- | --- |
| Pigment *1 | mass % | 10 |
| Resin (Cellulose resin) | mass % | 10 |

TABLE 1-continued

|  | | First and second colored ceramic pastes |
| --- | --- | --- |
| Organic solvent (Pine oil) | mass % | 10 |
| Glass binder *2 | mass % | 70 |
| Viscosity | dPs | 150 |

*1 Examples of components: copper oxide, chromium oxide, iron oxide, and manganese oxide
*2 Examples of components: bismuth borosilicate and zinc borosilicate 6-5

Although the case where the glass body according to the present invention is applied to a cover member has been described in the above-described embodiment, the glass body of the present invention can be used as not only a cover member but also a glass body for various applications. It is possible to use the glass body for windowpanes, partitions, screens, and the like for buildings and vehicles, for example. In particular, the glass body can be suitably used for all kinds of glass that may be touched by an unspecified number of people.

The glass body according to the present invention can be colorless and transparent, but also can be colored and transparent, or translucent, by adding color to at least one of the glass plate 1 and the antibacterial film 2.

Examples

Hereinafter, examples of the present invention will be described. However, the present invention is not limited to the examples below.

(1) Preparation of Examples

Cover members according to Examples 1 to 12 were formed by layering antibacterial films with different compositions on respective glass plates. Glanova with an outer shape of 100 mm×100 mm and a thickness of 1 mm manufactured by Nippon Sheet Glass Co., Ltd. was prepared as the glass plates.

Antibacterial-film-forming coating liquids having the following compositions were prepared for the antibacterial films of Examples 1 to 12. At that time, copper chloride was prepared in Examples 1 and 2, and copper nitrate was prepared in Examples 3 to 12.

TABLE 2

|  | Total Amount (g) | PGME (wt %) | Purified Water (mol/molSi) | cHCl (wt %) | 60% Nitric Acid (wt %) | $CuCl_2 \cdot 2H_2O$ (mol %) | $Cu(NO_3)_2 \cdot 3H_2O$ (mol %) | $B(OH)_3$ (mol %) | Ethyl Orthosilicate TEOS (wt % as $SiO_2$) |
| --- | --- | --- | --- | --- | --- | --- | --- | --- | --- |
| Ex. 1 | 20.0 | 89.0 | 6.0 | 0.025 | — | 10.00 | — | 10.00 | 2.00 |
| Ex. 2 | 4.0 | 81.0 | 10.0 | 0.025 | — | 7.00 | — | 7.00 | 2.86 |
| Ex. 3 | 8.0 | 86.8 | 10.0 | — | 0.050 | — | 7.0 | 5.0 | 2.00 |
| Ex. 4 | 8.0 | 86.8 | 10.0 | — | 0.050 | — | 7.0 | 5.0 | 2.00 |
| Ex. 5 | 8.0 | 86.6 | 10.0 | — | 0.050 | — | 10.0 | 5.0 | 2.00 |
| Ex. 6 | 8.0 | 86.6 | 10.0 | — | 0.050 | — | 10.0 | 15.0 | 2.00 |
| Ex. 7 | 8.0 | 86.4 | 10.0 | — | 0.050 | — | 15.0 | 10.0 | 2.00 |
| Ex. 8 | 8.0 | 86.2 | 10.0 | — | 0.050 | — | 20.0 | 10.0 | 2.00 |
| Ex. 9 | 8.0 | 85.8 | 10.0 | — | 0.050 | — | 30.0 | 10.0 | 2.00 |
| Ex. 10 | 8.0 | 85.8 | 10.0 | — | 0.050 | — | 30.0 | 20.0 | 2.00 |
| Ex. 11 | 8.0 | 93.3 | 10.0 | — | 0.050 | — | 10.0 | 10.0 | 1.00 |
| Ex. 12 | 8.0 | 93.3 | 10.0 | — | 0.050 | — | 10.0 | 10.0 | 1.00 |

The above-described coating liquids were respectively applied to the above-described glass plates through flow coating in an environment at a temperature of 20° C. and a humidity of 30% and then heated for 15 min in an oven set to 180° C., introduced into another oven set to 250° C. and heated for 30. The cover members according to Examples 1 to 10 were completed in this manner.

The contents of copper and boron in the antibacterial films of the cover members according to Examples 1 to 12 are as follows. The unit of numerical values in Table 3 is in mass % with respect to the $SiO_2$ content being taken as 100%.

TABLE 3

|        | Cu Content | B Content |
|--------|------------|-----------|
| Ex. 1  | 10.6       | 1.8       |
| Ex. 2  | 7.4        | 1.3       |
| Ex. 3  | 7.4        | 0.9       |
| Ex. 4  | 7.4        | 0.9       |
| Ex. 5  | 10.6       | 0.9       |
| Ex. 6  | 10.6       | 2.7       |
| Ex. 7  | 15.9       | 1.8       |
| Ex. 8  | 21.2       | 1.8       |
| Ex. 9  | 31.7       | 1.8       |
| Ex. 10 | 31.7       | 3.6       |
| Ex. 11 | 10.6       | 1.8       |
| Ex. 12 | 10.6       | 1.8       |

(2) Evaluation

The following tests were performed on the completed cover members.

2-1 Antibacterial Test

Antibacterial properties were evaluated under the following conditions based on JIS Z 2801:2012 (Film covering method) (corresponding to ISO22916).

Bacteria used for the test: *E. Coli* (*Escherichia coli*, NBRC 3972)

Form of specimen: the above-described cover members

Incubation time: 24 hours

Calculation of antibacterial activity value (R): R=(Ut–U0)–(At–U0)=Ut–At where U0 is the average of logarithmic values of the number of viable bacteria on the glass plate immediately after inoculation;

Ut is the average of logarithmic values of the number of viable bacteria on the glass plate 24 hours after inoculation; and At is the average of logarithmic values of the number of viable bacteria on the cover member 24 hours after inoculation.

Incubation conditions: temperature: 35° C., humidity: 90% or more (compliant with JIS)

Covering film: 40 mm×40 mm PP film (JIS standard)

Inoculation amount of test inoculum: 0.2 ml

Number of viable bacteria in test inoculum: $1.1 \times 10^6$

Measurement of number of viable bacteria: The number of viable bacteria on the glass plate immediately after inoculation with the inoculum and the number of viable bacteria on the cover member after 24 hours of incubation were measured.

As a result of the above-described test, all of the cover members had an antibacterial activity value of 5.8 or more. Because a specimen with an antibacterial activity value of 2.0 or more is evaluated to have antibacterial activity, sufficient antibacterial performance was confirmed in Examples 1 to 12.

2-2 Distribution of Copper

Figure 3:
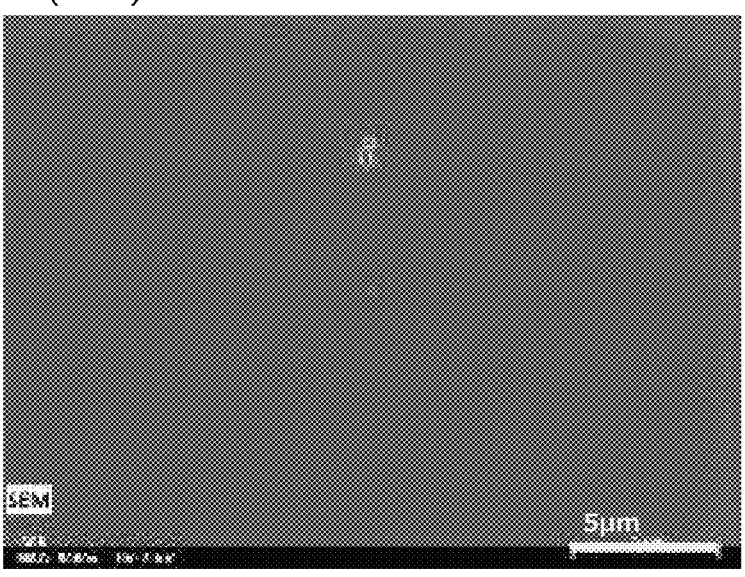
FIG. 3 is an image showing a distribution of copper in an antibacterial film of Example 3.
Figure 3:
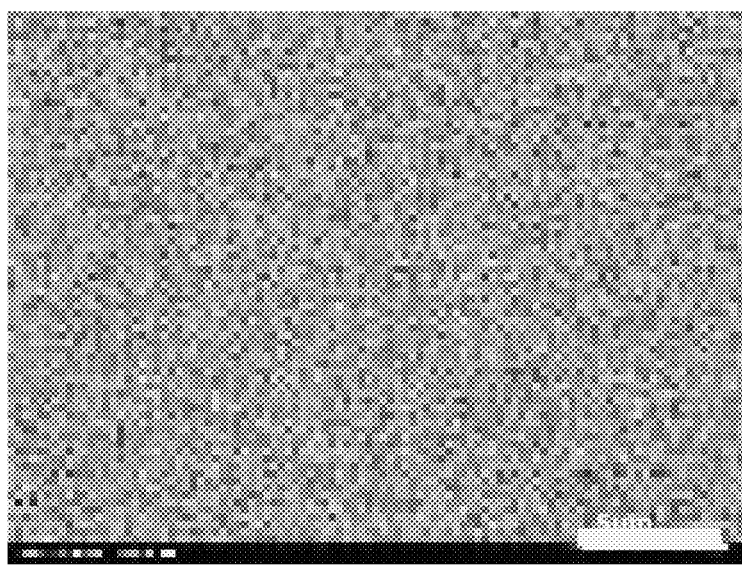
Figure 4:
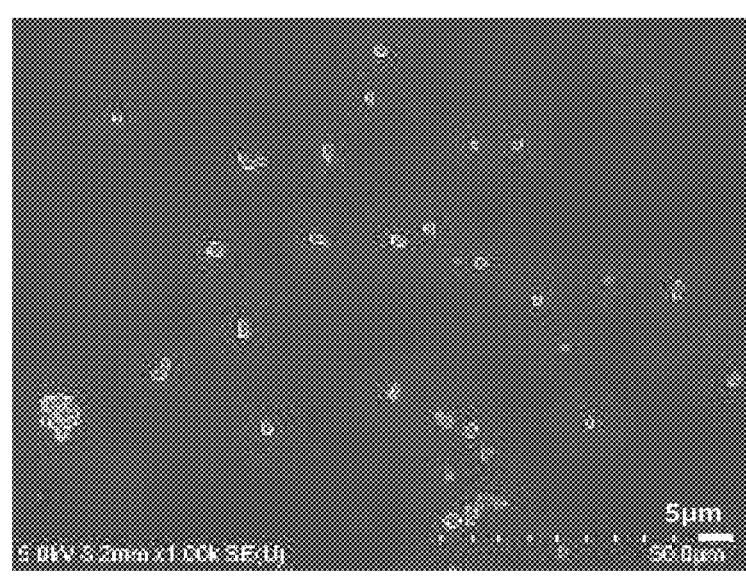
FIG. 4 is an image showing an antibacterial film in which metallic copper is distributed, as a reference example.

With regard to Example 3, the distribution of copper in the antibacterial film was examined. The surface of the antibacterial film was photographed by a SEM, and mapping of copper (copper ions) was performed on a predetermined range thereof. Mapping was performed through EDX (using SU8220, which is a field emission scanning electron microscope available from Hitachi High-Tech Corporation, with XFlash5060FQ (Bruker) as a detector). Measurement was made under the conditions that the acceleration voltage was 5 kV and the sample inclination was 0 degrees from a flat surface. FIG. 3 shows the results thereof, and white and gray portions other than black portions of an image that was subjected to the mapping indicate copper, and according to FIG. 3, it can be seen that copper ions are uniformly dispersed with almost no gaps. For comparison, a cover member in which metallic copper microparticles were dispersed in an antibacterial film was prepared. FIG. 4 shows an image of the antibacterial film of this cover member taken by the SEM. In FIG. 4, white portions indicate copper. When FIG. 3 and FIG. 4 were compared with each other, it was found that, when the network structure of Si and O contains copper due to ionic bonds as shown in FIG. 3, copper ions can be dispersed in the entire antibacterial film without gaps.

Note that FIG. 3 shows the results of Example 3, and the inventors of the present invention also obtained similar results for the other examples.

2-3 Durability Test

Examples 1 to 10 were immersed in 25 ml of water, 1.5 ml was extracted from the water after 16 hours, and the elution amount of copper ions (elution amount per coating unit area) was calculated. This elution amount was calculated as follows. First, a test water, which was treated with PACKTEST Copper (manufactured by Kyoritsu Chemical-Check Lab., Corp.) to develop color, was subjected to measurement, and the concentration of copper ions contained in the liquid was measured using DIGITALPACK-TEST Copper (manufactured by Kyoritsu Chemical-Check Lab., Corp.), the obtained concentration thereof was converted to the amount per coating unit area, and the mass % of the elution amount with respect to copper before the test was performed was calculated. The results thereof are shown in Table 4 below.

TABLE 4

|        | Elution Amount |
|--------|----------------|
| Ex. 1  | 38%            |
| Ex. 2  | 39%            |
| Ex. 3  | 9%             |
| Ex. 4  | 6%             |
| Ex. 5  | 14%            |
| Ex. 6  | 15%            |
| Ex. 7  | 15%            |
| Ex. 8  | 18%            |
| Ex. 9  | 14%            |
| Ex. 10 | 15%            |

At least 60% of copper remained in all of the examples despite a harsh environment in which these examples were immersed in water for 16 hours. Therefore, it was confirmed that antibacterial performance lasted for a long period of time. In particular, the elution amounts of Examples 3 to 7 in which the coating liquids were prepared using copper nitrate were low.

2-4 Film Strength Test

Steel wool with a size of 10 mm×10 mm was pressed against each of the antibacterial films of the cover members of Examples 1 to 4 using a load of 1 kg, and was moved a distance of 50 mm at a speed of 120 mm/s. Then, the number of instances until the antibacterial film was peeled off was measured. Also, a surface pencil hardness test specified in JIS-K5600-5-1 (1999) was performed on the antibacterial films of the cover members of Examples 1 to 3. The results thereof are as follows.

TABLE 5

|  | Steel Wool Test | Pencil Hardness |
| --- | --- | --- |
| Ex. 1 | 100 times | less than 3H |
| Ex. 2 | 250 times | 3H |
| Ex. 3 | 2000 times or more | 9H |
| Ex. 4 | 2000 times or more | — |

It was found that all of Examples 1 to 4 had a sufficient film strength capable of withstanding normal use. In particular, it was found that Examples 3 and 4 in which the coating liquids were prepared using copper nitrate had a high film strength.

LIST OF REFERENCE NUMERALS

1 Glass plate
2 Antibacterial film
22 Antibacterial microparticles
10 Cover member
100 Member to be protected

The invention claimed is:

1. A glass body comprising:
a glass plate having a first surface and a second surface; and
an antibacterial film that is formed on the first surface and in which copper ions are dispersed,
wherein the antibacterial film contains boron, and
D2/D1>0.8 is satisfied, where a thickness of the antibacterial film is D1 and a thickness of the antibacterial film obtained after the glass body is heated at 600° C. is D2, and
wherein the antibacterial film comprises a network structure of Si and O, and wherein the copper ions are ionically bonded to the network structure.

2. The glass body according to claim 1,
wherein the antibacterial film does not contain copper particles or copper compound particles with an outer diameter of 100 nm or more.

3. The glass body according to claim 1,
wherein the antibacterial film contains at least one of a silicon oxide, zirconia, titania, and alumina as a main component.

4. The glass body according to claim 1,
wherein the antibacterial film contains the copper ions in an amount of 1 to 40 mass % with respect to a main component that constitutes the antibacterial film.

5. The glass body according to claim 1,
wherein the antibacterial film has a film thickness of 20 to 500 nm.

6. The glass body according to claim 1,
wherein, when the maximum thickness of the antibacterial film is Dmax and the minimum thickness of the antibacterial film is Dmin, Dmax/Dmin≤7 is satisfied.

7. The glass body according to claim 6,
wherein a portion of the antibacterial film with a thickness of the Dmin is located at an end portion of the antibacterial film.

8. The glass body according to claim 1,
wherein the antibacterial film contains an acidic oxide serving as a network former.

9. The glass body according to claim 1,
wherein the antibacterial film contains the boron in an amount of 0.1 to 10 mass % with respect to a main component that constitutes the antibacterial film.

10. The glass body according to claim 1,
wherein after the glass body is immersed in water for 16 hours, an elution amount of the copper ions is 20 mass % or less of the copper ions contained therein before the immersion.

11. The glass body according to claim 1,
wherein the glass body has a visible light transmittance of 90% or more.

12. The glass body according to claim 1,
wherein the antibacterial film has a surface roughness Ra of less than 120 nm.

13. The glass body according to claim 1,
wherein the glass body has a haze ratio of 3% or less.

14. The glass body according to claim 1, further comprising:
an anti-fingerprint layer formed on at least a portion of the antibacterial film.

15. A method for producing the glass body of claim 1, comprising:
producing a coating liquid by adding a copper salt and boric acid to a solution containing silicon alkoxide;
applying the coating liquid to at least one surface of a glass plate; and
heating the glass plate to which the coating liquid has been applied to a predetermined temperature or higher.

* * * * *